(12) United States Patent
Tajima et al.

(10) Patent No.: US 9,111,554 B2
(45) Date of Patent: Aug. 18, 2015

(54) OPTICAL DATA RECORDING MEDIUM AND METHOD FOR REPRODUCING RECORDED DATA

(75) Inventors: Hideharu Tajima, Izumi (JP); Nobuyuki Takamori, Kitakatsuragi-gun (JP); Go Mori, Nara (JP); Masaki Yamamoto, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 2623 days.

(21) Appl. No.: 10/824,926

(22) Filed: Apr. 14, 2004

(65) Prior Publication Data

US 2004/0240374 A1 Dec. 2, 2004

(30) Foreign Application Priority Data

May 30, 2003 (JP) ................. 2003-155668

(51) Int. Cl.
  *G11B 7/24* (2013.01)
  *G11B 7/257* (2013.01)
  *G11B 7/243* (2013.01)
  *G11B 7/258* (2013.01)

(52) U.S. Cl.
  CPC *G11B 7/257* (2013.01); *G11B 7/24* (2013.01); *G11B 7/243* (2013.01); *G11B 7/258* (2013.01); *G11B 2007/2432* (2013.01); *G11B 2007/24304* (2013.01); *G11B 2007/2571* (2013.01)

(58) Field of Classification Search
  USPC .......................................... 428/64.1; 430/320
  See application file for complete search history.

(56) References Cited

U.S. PATENT DOCUMENTS

| 5,006,387 | A |   | 4/1991  | Takao et al. |
| 5,170,390 | A |   | 12/1992 | Ohta et al. |
| 5,177,727 | A |   | 1/1993  | Mashimo |
| 5,244,706 | A | * | 9/1993  | Hirata et al. ................. 428/64.8 |
| 5,252,262 | A | * | 10/1993 | Patel ............................ 264/1.26 |
| 5,350,506 | A |   | 9/1994  | Dombek et al. |
| 5,371,730 | A | * | 12/1994 | Maeda et al. ................. 720/725 |
| 5,410,525 | A |   | 4/1995  | Yokota |

(Continued)

FOREIGN PATENT DOCUMENTS

| JP | 06-028713   | 2/1994 |
| JP | 2001-035012 | 2/2001 |

(Continued)

OTHER PUBLICATIONS

U.S. Appl. No. 10/804,328, filed Mar. 18, 2004, Nobuyuki Takamori, et al.

(Continued)

*Primary Examiner* — Joseph Feild
*Assistant Examiner* — Henok Heyi
(74) *Attorney, Agent, or Firm* — Keating & Bennett, LLP

(57) ABSTRACT

An optical data recording medium, in which irradiation of a light beam is used for recording and/or reproducing data includes (i) a substrate having an a rise and/or a recess which are a light-incident surface, (ii) a reflective layer, provided on the light-incident surface of the substrate, for reflecting the light beam, (iii) a light absorption layer for converting, to heat, a light of the light beam to heat on the surface of the reflective layer, (iv) a reproducing layer, provided on the surface of the heat-light converting layer, having a transmittance that changes in accordance with a light intensity distribution of the light beam. The optical data recording medium is excellent in super-resolution property, and enables reproduction of a shorter mark length.

14 Claims, 6 Drawing Sheets

(56) References Cited

U.S. PATENT DOCUMENTS

| | | | |
|---|---|---|---|
| 5,448,552 A | 9/1995 | Onagi | |
| 5,470,628 A * | 11/1995 | Tominaga et al. | 428/64.4 |
| 5,488,552 A | 1/1996 | Sakamoto et al. | |
| 5,503,890 A * | 4/1996 | Jung | 428/64.1 |
| 5,516,568 A * | 5/1996 | Jung | 428/64.1 |
| 5,569,517 A * | 10/1996 | Tominaga et al. | 428/64.1 |
| 5,610,879 A * | 3/1997 | Moriya et al. | 369/13.24 |
| 5,615,185 A | 3/1997 | Horikiri et al. | |
| 5,635,267 A | 6/1997 | Yamada et al. | |
| 5,668,789 A | 9/1997 | Yokota et al. | |
| 5,691,072 A | 11/1997 | Izumi et al. | |
| 5,698,093 A | 12/1997 | Pyle et al. | |
| 5,708,652 A | 1/1998 | Ohki et al. | |
| 5,817,389 A | 10/1998 | Ono | |
| 5,844,882 A | 12/1998 | Yoshida et al. | |
| 6,071,587 A * | 6/2000 | Yoshinari et al. | 428/64.1 |
| 6,128,272 A | 10/2000 | Horimai et al. | |
| 6,233,219 B1 | 5/2001 | Hori et al. | |
| 6,246,656 B1 * | 6/2001 | Kawakubo et al. | 369/112.23 |
| 6,329,036 B1 | 12/2001 | Kikukawa et al. | |
| RE39,811 E | 9/2007 | Ogusu et al. | |
| 7,457,215 B2 | 11/2008 | Kuwahara et al. | |
| 8,194,513 B2 | 6/2012 | Tajima et al. | |
| 2002/0009037 A1 | 1/2002 | Tamada | |
| 2002/0015377 A1 | 2/2002 | Koyama et al. | |
| 2002/0021644 A1 | 2/2002 | Maeda et al. | |
| 2002/0024909 A1 | 2/2002 | Kamioka et al. | |
| 2002/0060965 A1 | 5/2002 | Tobita et al. | |
| 2002/0168588 A1 * | 11/2002 | Takamori et al. | 430/270.15 |
| 2002/0191527 A1 | 12/2002 | Kikukawa et al. | |
| 2003/0002411 A1 | 1/2003 | Kuroda | |
| 2003/0103429 A1 | 6/2003 | Senshu | |
| 2003/0107977 A1 | 6/2003 | Nakano et al. | |
| 2003/0156502 A1 | 8/2003 | Murakami et al. | |
| 2003/0193862 A1 | 10/2003 | Miyamoto et al. | |
| 2003/0202430 A1 | 10/2003 | Nishikawa | |
| 2003/0206504 A1 | 11/2003 | Nishiuchi et al. | |
| 2003/0214901 A1 | 11/2003 | Koyama et al. | |
| 2004/0013080 A1 | 1/2004 | Moribe et al. | |
| 2004/0017736 A1 | 1/2004 | Suzuki et al. | |
| 2004/0071074 A1 | 4/2004 | Ootera | |
| 2004/0076083 A1 | 4/2004 | Nishikawa et al. | |
| 2004/0170842 A1 | 9/2004 | Yamamoto et al. | |
| 2004/0190432 A1 | 9/2004 | Ichihara et al. | |
| 2004/0197517 A1 | 10/2004 | Yamamoto et al. | |
| 2005/0028184 A1 | 2/2005 | Takemoto et al. | |
| 2005/0237912 A1 | 10/2005 | Kikukawa et al. | |
| 2010/0014407 A1 | 1/2010 | Yamamoto et al. | |
| 2010/0046333 A1 | 2/2010 | Mori et al. | |
| 2010/0091639 A1 | 4/2010 | Shima et al. | |
| 2010/0103807 A1 | 4/2010 | Tajima et al. | |

FOREIGN PATENT DOCUMENTS

| | | |
|---|---|---|
| JP | 2003-308630 | 10/2003 |
| JP | 2003-338053 A | 4/2005 |

OTHER PUBLICATIONS

U.S. Appl. No. 10/862,187, filed Jun. 4, 2004, Go Mori, et al.
U.S. Appl. No. 10/713,349, filed Nov. 14, 2003, Takamori.
U.S. Office Action dated Apr. 1, 2011 for U.S. Appl. No. 12/587,506.
U.S. Office Action dated Apr. 1, 2011 for U.S. Appl. No. 12/802,671.
U.S. Office Action dated Aug. 4, 2011 for U.S. Appl. No. 12/802,667.
Office Action dated Jul. 22, 2010 regarding U.S. Appl. No. 11/981,974.
U.S. Office Action dated Apr. 1, 2011 for U.S. Appl. No. 12/802,761.
U.S. Office Action dated Apr. 28, 2011 for U.S. Appl. No. 11/981,974.
U.S. Office Action dated Jan. 6, 2012 for U.S. Appl. No. 12/587,506.
U.S. Office Action dated Jan. 5, 2012 for U.S. Appl. No. 12/802,671.
U.S. Office Action dated Jan. 13, 2012 for U.S. Appl. No. 11/981,974.
U.S. Office Action dated Mar. 21, 2013 for U.S. Appl. No. 12/587,506.
Office Action issued on Jun. 12, 2013 for co-pending related U.S. Appl. No. 12/802,672.
U.S. Office Action dated Sep. 28, 2011 for U.S. Appl. No. 12/802,671.
U.S. Office Action dated Jan. 18, 2013 for U.S. Appl. No. 12/802,672.
Notice of Allowance issued on Jul. 25, 2013 for co-pending related U.S. Appl. No. 11/981,974.
U.S. Office Action dated Aug. 2, 2012 for U.S. Appl. No. 11/981,974.
U.S. Office Action dated Oct. 31, 2012 for U.S. Appl. No. 12/802,671.
U.S. Office Action dated Nov. 5, 2012 for U.S. Appl. No. 12/587,506.
U.S. Office Action dated Dec. 7, 2011 for U.S. Appl. No. 12/802,667.
U.S. Office Action dated Jun. 7, 2012 for U.S. Appl. No. 12/802,671.
U.S. Office Action dated Mar. 7, 2011 for U.S. Appl. No. 12/802,672.
U.S. Office Action dated Apr. 2, 2013 for U.S. Appl. No. 11/981,974.

* cited by examiner

OPTICAL DATA RECORDING MEDIUM AND METHOD FOR REPRODUCING RECORDED DATA

This Nonprovisional application claims priority under 35 U.S.C. §119(a) on patent application No. 2003/155668 filed in Japan on May 30, 2003, the entire contents of which are hereby incorporated by reference.

FIELD OF THE INVENTION

The present invention relates to (i) an optical data recoding medium for recording or reproduction of data, and (ii) a method for reproducing data from the optical data recording medium.

BACKGROUND OF THE INVENTION

In order to obtain an optical data recording medium having bigger storage capacity, there has been a demand for a technique to record and reproduce a signal in accordance with a further shorter mark length (pit length) in the optical data recording medium. Recently, an optical data recording medium has been developed which enables reproduction of a signal from a mark having a mark length shorter than a mark length of resolution limit of an optical system of a reproducing apparatus. Hereinafter, the optical data recording medium is referred as a "super-resolution optical data recording medium."

The super-resolution optical data recording medium includes at least a reproducing layer and a reflective layer layered in this order on a substrate. The super-resolution optical data recording medium employs a method of virtually reducing a spot size of a laser beam which reaches the reflective layer. Specifically, the spot size of the laser beam which reaches the reflective layer is reduced by irradiating a reproducing laser beam via the substrate to the reproducing layer. In this way, the reproducing layer has such an optical characteristic with respect to the reproducing laser beam that is distributed unevenly over the reproducing layer.

In other words, light intensity in the spot of the reproducing laser beam irradiated to the reproducing layer is unevenly distributed. Because of this, temperature is also distributed unevenly therein spontaneously. Therefore, in such an arrangement wherein the reproducing layer is made of a material whose optical characteristics (mainly transmittance) is are changed by temperature or light intensity distribution, it is possible to increase only the transmittance of that part of the reproducing layer which is at the center of the laser beam spot because temperature is high and light intensity is high in the part at the center of the laser beam spot. When transmittance is increased only in that part of the reproducing layer which is at the center of the laser beam spot, the reflection layer receives only the light of the center of the laser spot. That is, the laser beam spot irradiated on the surface of the reflective layer is virtually reduced. Therefore, in the super-resolution optical data recording medium, it is possible to reproduce a mark having a mark length shorter than a mark of resolution limit of the optical system.

As an example of a layer material whose optical characteristic is changeable by light intensity, a shutter layer (a layer in which semi-conductor fine particles are dispersed in a matrix made of glass or resin) is described in Japanese Publication for Unexamined Patent Application No. 6-28713 (Tokukaihei 6-28713, published on Feb. 1, 1994). In the arrangement of the patent application, as shown in FIG. 7, the shutter layer (reproducing layer) 42 and the optical reflective layer 44 are layered on that surface of the substrate 45 which is reverse to the surface from above which the laser beam is irradiated.

Incidentally, as an example of a raw material whose transmittance is increased by high temperature, a thermochromic pigment is described in Japanese Publication for Unexamined Patent Application No. 2001-35012 (Tokukai 2001-35012, published on Feb. 9, 2001). In the optical data recording medium described in the patent application, as shown in FIG. 8, a mask layer (reproducing layer) 32, a first dielectric layer 36, a phase change recording film 37, a second dielectric 38, a reflective layer 34, and a protective resin layer 39 are layered in this order on that surface of the substrate 35 which is reverse to the surface from above which the laser beam 30 is irradiated.

As described above, in each conventional super-resolution optical data recording medium, the reproducing layer is provided on that surface (non-light-incident surface) of the substrates which is reverse to the surface (incident surface) from above which the laser beam is irradiated.

However, in the conventional optical data recording media, resolution limit is not enough. Therefore, there is a demand for an optical data recording medium having a greater resolution limit.

In the arrangement in which a reproducing layer is provided on the non-light-incident surface, the reproducing layer cannot be thicker because a recording layer and a reflective layer are also provided in the optical data recording medium. Accordingly, the optical data recording medium including a further shorter mark length cannot be reproduced.

Specifically, in the conventional optical data recording medium, generally the reflective layer has a non-flat surface (a rise and/or a recess, for example formed by pits and/or groove, or the like). When the laser beam is irradiated to the non-flat surface, a laser beam reflected from the rise part of the non-flat surface is different in quantity from one reflected from the recess part of the non-flat surface because of interference. By using the difference, tracking on grooves, and signal reproduction are performed. The rise and/or the recess of the reflective layer is formed by forming a non-flat surface on the substrate by using a pit and a groove, or the like, which are for storing data or for locating a reproducing point. The reflective layer is layered on the substrate. Thereafter, in the conventional arrangement, the reproducing layer is provided on the substrate having the rise and/or the recess, and the recording layer and the reflective layer are layered in this order on the reproducing layer. Accordingly, when the reproducing layer is too thick, the rise and/or the recess are leveled off, and thus the recording layer and the reflective layer cannot have a non-flat surface.

In the above-mentioned Japanese Publication for Unexamined Patent Application No. 6-28713, there is an example that the rise and/or the recess of the substrate are leveled off because the reproducing layer layered on the substrate is too thick. In the example, a resin layer is used as the reproducing layer, and the resin is so adhesive that it is very difficult to attain a thin thickness of the resin layer. Thus, there is a high possibility that the formation of the resin layer will level off the non-flat surface of the substrate, the rise and/or the recess being a source of data. In case the reflective film is provided on the substrate having such leveled-off non-flat surface, no interference in the reflected light beam will be caused by the leveled-off rise and/or the leveled-off recess, whereby, data cannot be read out. Moreover, as to an inorganic film, which may have a thin thickness, the same is true that there is a possibility that a thick thickness of the inorganic film will level off the rise and/or the recess. Therefore, there is a limit in how thick the reproducing layer can be.

The arrangement in which the thickness of the reproducing layer is thin in view of the above limitation faces the following problem: for example, in the case that the reproducing layer has a greater transmittance with a thicker thickness, the thin thickness limits how much the laser spot can be reduced, thereby prohibiting the optical data recording medium from having a better resolution limit.

Also, it is considered that the resolution limit of the optical data recording medium is limited by various factors apart from the limitation of the thickness of the reproducing layer.

SUMMARY OF THE INVENTION

The present invention is made in light of the foregoing problems. An object of the present invention is to provide an optical data recording medium in which a signal can be reproduced from a mark having a shorter mark length (that is, enables reproduction of a shorter mark length), and in which data can be recorded in high-density.

To achieve the object, an optical data recording medium, in which irradiation of a light beam is used for recording or reproducing data, includes a reproducing layer, provided to face a light-incident surface of the substrate, the reproducing layer for reproduction of a signal from a mark having a mark length shorter than a mark length of a resolution limit of an optical system of a reproducing apparatus for reproducing the optical data recording medium.

The "reproducing layer for reproduction of a signal from a mark having a mark length shorter than a mark length of a resolution limit of an optical system of a reproducing apparatus" is a layer for reproduction of a signal from a mark having a shorter mark length smaller than a laser beam spot narrowed by the optical system of the reproducing apparatus. For example, with an arrangement in which the reproducing layer is made of a material whose transmittance increases upon reception of intensive light or high temperature, only a highly intensive part of the light beam irradiated on the reproducing layer passes through the reproducing layer, thereby giving a smaller beam spot size to the light beam emitted from the reproducing layer. This makes it possible to reproduce a signal from a mark having a shorter mark length than the beam spot narrowed by the optical system of the reproducing apparatus.

In light of the characteristics of the material, the reproducing layer needs to be provided so that the light beam is radiated via the reproducing layer to the layers such as a layer for reflecting the laser beam. Therefore, in case where the reproducing layer is provided on a non-light-incident surface of the substrate, it is necessary that the reproducing layer be provided on the non-light-incident surface of the substrate, and the other layers such as the reproducing layer are provided on a top of the reproducing layer. On the other hand, according to this arrangement, the reproducing layer is so provided that the light is radiated from above the reproducing layer and the reproducing layer is the furthest from the substrate (except the cover layer), no matter how the other layers are provided.

In other words, the reproducing layer can be formed so as to face the light-incident surface of the substrate, after the other layers are provided. Therefore, the reproducing layer can have an arbitrary thickness without limitation from the shape of the other layers. For example, in the case wherein a reproducing layer is used whose greater thickness gives more greatly changeable transmittance thereof, this arrangement attains a better resolution and a smaller spot size of the light beam, thereby enabling the reproduction of the signal from a mark having a further shorter mark length. This makes it possible to provide the optical data recording medium that is more excellent in super-resolution property and enables storage/reproduction of data in higher density.

Note that this arrangement attains not only freedom in designing the thickness of the reproducing layer. As described in Examples, improvement in resolution limit was observed in the optical data recording medium having this arrangement and being identical with a conventional optical data recording medium in terms of the thickness of the reproducing layer, and the like condition.

To achieve the object of the present invention, the optical data recording medium, in which irradiation of a light beam is used for reproducing data, includes steps of (i) irradiating the light beam from above the reproducing layer, and (ii) reproducing the mark having a mark length shorter than resolution limit of the optical system of the reproducing apparatus. On account of this, it becomes possible to reproduce data from the optical data recording medium in which data is recorded in high-density.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) is a plain view illustrating a temperature distribution of the reproducing laser beam in the irradiated spot. FIG. 2(b) is a diagram illustrating (i) cross section of the optical data recording medium and (ii) a temperature distribution.

DESCRIPTION OF THE EMBODIMENTS

Hereinafter, an embodiment of the present invention is explained with reference to figures.

Figure 1:
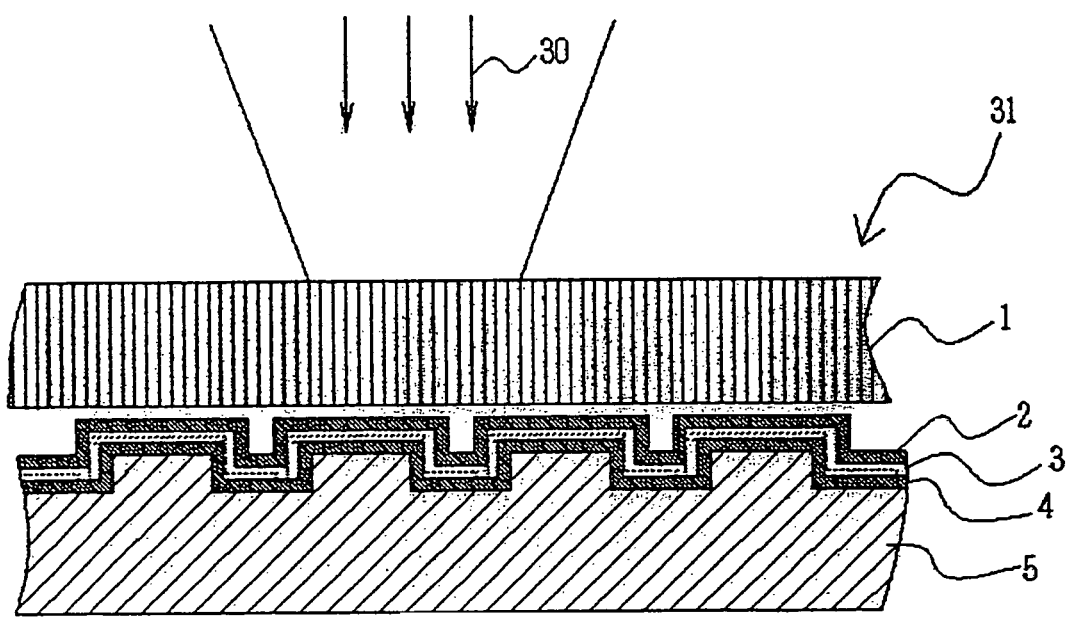
FIG. 1 is a cross section view of an optical data recording medium of an embodiment of the present invention.

An optical data recording medium 31 of one embodiment of the present invention is a reproducing only optical data recording medium. As shown in FIG. 1, the optical data recording medium 31 is provided with a reflective layer 4, a light absorption layer 3, a reproducing layer 2, a substrate 5, and a cover layer 1. The reflective layer 4, light absorption layer 3, reproducing layer 2 are layered on the substrate 5 in this order. On the reproducing layer 2, the cover layer 1 is provided. In the optical data recording media 31, the cover layer 1 does not completely adhere to the reproducing layer 2, and a layer of air is formed between the cover layer 1 and the reproducing layer 2.

A laser beam 30 is irradiated, from above the cover layer 1, to the optical data recording medium 31. The laser beam passes through the cover layer 1 and the layer of air, and reaches the reproducing layer 2. Then the laser beam reaches the reflective layer 4 via the reproducing layer 2 and light absorption layer 3. The laser beam 30 reflected from the reflective layer 4 is converted to a signal corresponding to the rise and/or the recess of the reflective layer 4.

The substrate 5 gives appropriate strength to the optical data recording medium 1. On an light-incident surface of the substrate 5 (that surface of the substrate 5 from above which the laser light beam is irradiated; that is, that surface of the substrate 5 above which the reproducing layer 2 is provided), pits and grooves are provided. The pits, which form the rise and/or the recess, correspond to recorded data, and the grooves are used for guiding, that is, for recording a start address and end address of recording. The optical data recording medium 31 may be provided with both the pits and the grooves, or with either the pits or the grooves. However, in the arrangement in which the optical data recording medium 1 includes the guiding grooves, data can be recorded or reproduced without imposing a burden on a reproducing/recording device.

Optical characteristics of the material of which the substrate 5 is made are not particularly limited. Thus, the material of which the substrate 5 is made can be transparent or opaque. The material may be, for example, (i) glass, (ii) a thermoflexible transparent resin such as a polycarbonate, an amorphous polyolefin, a thermoplastic polyimide, PET (polyethylene terephtalate), PEN (polyethylene naphthalate), and PES (polyether sulfone), (iii) a thermo-cured transparent resin such as a thermo-cured polyimide, and an ultraviolet radiation cured acrylic resin, (iv) a metal, or (v) the like. The substrate 5 may be made of one of these materials solely or two or more of these materials used in combination. Also, thickness of the substrate 5 is not particularly limited. However around 0.5 mm through 1.2 mm, for example, is appropriate. A pitch of the pit may be, for example, around 0.3 μm through 1.6 μm, and a depth of the pit may be, for example, around 30 nm through 200 nm. It is appropriate for a pitch of the guiding groove to be around 0.3 μm through 1.6 μm, and it is appropriate for depth of the guiding groove to be around 30 through 200 nm.

The reflective layer 4 reflects the laser beam which has passed through the cover layer 1, the reproducing layer 2, and the light absorption layer 3. Here, the reflective layer 4 has a non-flat surface (a rise and/or a recess) because a reflective film 4 is provided on the non-flat surface of the substrate 5. A reproducing signal is produced in accordance with quantity of the light beam reflected from the reflective layer 4 (the quantity of the laser beam is variable depending on the rise and/or the recess in a laser-beam-irradiated area of the reflective layer 4).

It is preferable that the reflective layer 4 is a metal film having high reflectance such as an Al film, an Au film, an Ag film, or a film of an alloy of those compounds. Because the reflective layer 4 is not particularly limited in thickness, it may have any thickness to realize a desired reflectance. For example, the thickness of the reflective layer 4 may be around 20 nm through 100 nm.

The light absorption layer 3, by receiving the reproducing laser beam 30, assists temperature change in the reproducing layer 2. The light absorption layer 3 is made of a material which absorbs the reproducing laser beam 30 and converts the laser beam to heat. The light absorption layer 3 changes its temperature in accordance with the light intensity distribution, and conducts to the reproducing layer 2, heat thus generated.

The light absorption layer 3 may be a Si (silicon) film; a Ge (germanium) film; a phase change film such as a AgInSbTe film and a GeSbTe film, and the like; a magnet-optical film such as TbFeCo film, DyFeCo film, GdFeCo film, and the like; and a metal film of an alloy of these compounds. Especially, it is the most preferable that the light absorption layer 3 is the Si film, the Ge film, or a metal film of alloy of Si and Ge, because of their low cost. Film thickness of the light absorption layer 3 may be set to be appropriate depending on which material the light absorption layer 3 is made of. For example, it is appropriate that the light absorption layer 3 has a thickness in a range of 5 nm through 300 nm. However, it is preferable that the film thickness of the light absorption layer 3 is no less than 10 nm. Therefore, it is the most preferable that the light absorption layer 3 is the Si film having a thickness of no less than 10 nm.

It is preferable that the reproducing layer 2 is contiguous to the light absorption layer 3, as shown in FIG. 1. With this arrangement, the light absorption layer 3 can effectively raise the temperature of the reproducing layer 2 by absorbing, for example, the reproducing laser beam 30 and converting the beam to heat. However, the reproducing layer 2 may be so arranged as not to be contiguous to the light absorption layer 3, as long as the light absorption layer 3 and the reproducing layer 2 are close enough to allow the light absorption layer 3 to increase the temperature of the reproducing layer 2.

In addition, the optical data recording medium 31 may be so arranged as not to include the light absorption layer 3. In this case, however, the reproducing layer 2 must be made of a material whose optical characteristic is changed only by light intensity, or the reproducing layer 2 must have light-heat converting function by containing a substance which absorbs the reproduction light and generates heat.

The reproducing layer 2, which is a translucent material whose transmittance is changed reversibly as a temperature changes, contains a material whose transmittance with respect to a wavelength of the reproduction laser beam 30 increases as a temperature rises. With this arrangement, transmittance is increased only in a temperature-rising part of the laser beam spot of the reproduction laser beam 30 (a smaller spot near at a center of the reproduction beam 30). Accordingly, the diameter of the laser beam spot of the laser beam having passed through the reproducing layer 2 becomes smaller than the diameter of the spot of the reproducing laser beam 30. On account of this, it is possible to perform reproduction of a shorter mark length.

It is appropriate that the reproducing layer 2 includes a material whose transmitting efficiency in specified wavelength area greatly changes when temperature rises. Specifically, the reproducing layer 2 preferably includes a material whose transmitting efficiency of the reproducing layer 2 changes in the range of ±80% when temperature rises from 20° C. to a temperature in a range of 60° C. through 180° C. The material may be a thermochromism substance. The thermochromism substance is a substance whose transmittance changes due to a chemical structural change caused by heat absorption.

It is possible to raise specific examples of the thermochromism substance as follows: (i) an inorganic thermochromism substance such as metal oxides and the like; and (ii) an organic thermochromism substance such as (a) a mixture of (a-1) lactone or fluorane and (a-2) an alkalis, (b) a mixture of leuco pigment and organic acid, and (c) the like. It is particularly preferable that, from among those substances, the thermochromism substance is a metal oxide whose transmittance of the absorption edge changes in accordance with a change in its width of forbidden band. The change in the width of forbidden band is caused by temperature change. This is because composition and shape of the reproducing layer 2 made of a metal oxide are hardly changed even after chemical structural changes due to temperature change are repeated. In other words, this metal oxide gives excellent durability to the reproducing layer 2.

It is possible to raise specific examples of the metal oxide as follows: ZnO, $SnO_2$, $CeO_2$, $CeO_2$, $NiO_2$, $In_2O_3$, $TiO_2$, $Ta_2O_5$, $VO_2$, $SrTiO_3$, and the like. Of these metal oxides, it is the most preferable that the reproducing layer 2 is made of ZnO (zinc oxide) as described in Example 2 below. This is because reproduction from a mark having a further shorter mark length is possible in case that the reproducing layer 2 is made of ZnO. The reproducing layer 2 may be made of a conventional material for reproducing layers. Examples of the conventional material for reproducing layers are: a glass having semi-conductor fine grain; a resin; a thermochromic pigment layer; a phase change film; and the like.

Film thickness of the reproducing layer 2 may be set depending on which material the reproducing layer 2 is made of. The film thickness of the reproducing layer 2 may be in a range of from 5 nm through 800 nm appropriately, and it is more appropriate that film thickness of the reproducing layer 2 is no less than 100 nm. Therefore, it is the most appropriate that the reproducing layer 2 is the ZnO film whose film thickness is no less than 100 nm.

Figure 7:
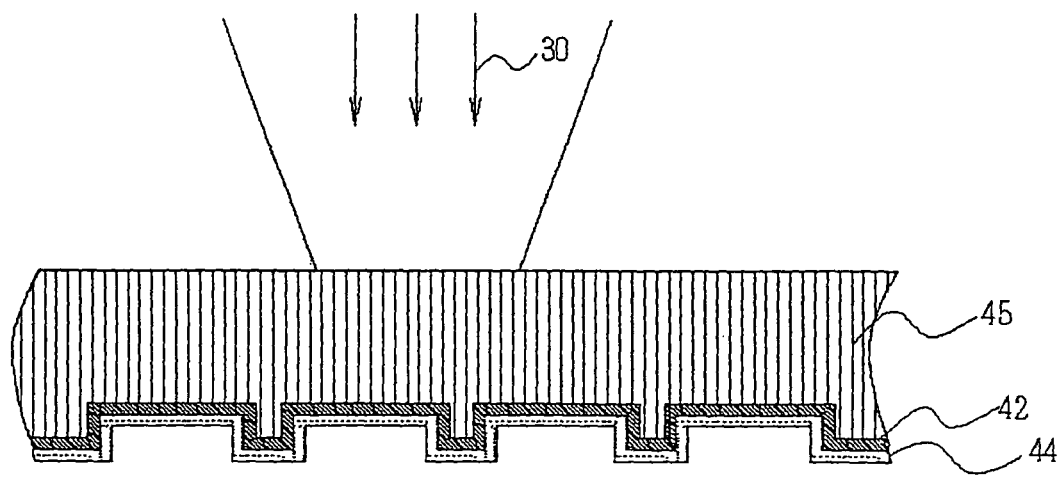
FIG. 7 is a cross section view of a conventional optical data recording medium.
Figure 8:
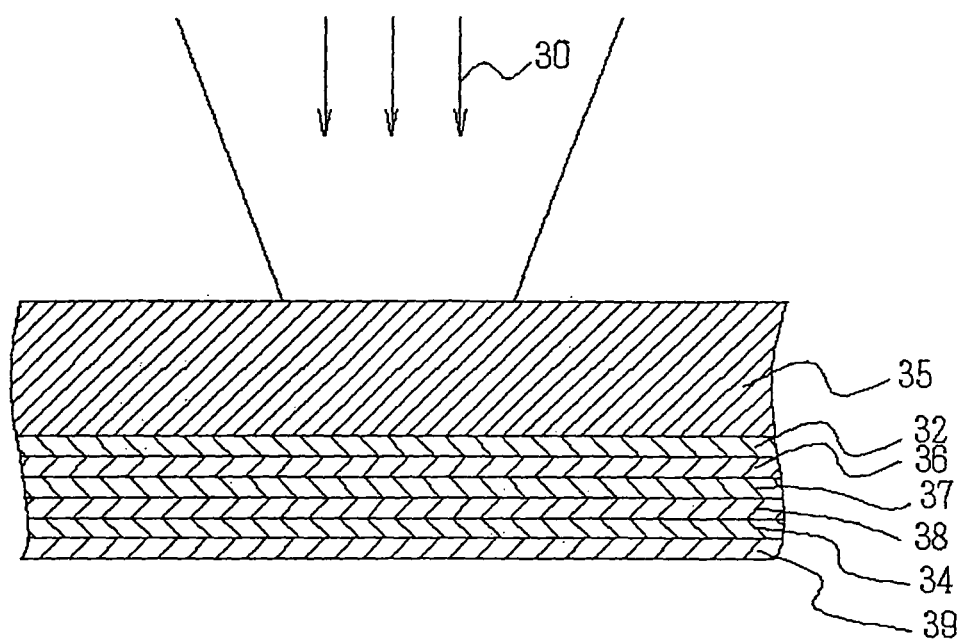
FIG. 8 is a cross section view of another conventional optical data recording medium.

The cover layer 1 is provided so that the optical system of the present embodiment of the present invention is the same as the optical system of the arrangement shown in FIG. 7. Generally, the cover layer is provided to protect the optical data recording medium 31. It is preferable that film thickness of the cover layer 1 is in a range of from 1 µm through 100 µm. Also, the cover layer 1 needs to be transparent so that the reproducing laser beam 30 can pass through the cover layer 1.

In this arrangement, the reflective layer 4, and the light absorption layer 3 are layered in this order on the surface of the substrate. On the top of the light absorption layer 3, the reproducing layer 2 is layered. In this way, the reproducing layer 2 is the top layer of the laminated layers (the layer which is the furthest from the surface of the substrate except the cover layer).

Therefore, the reproducing layer 2 can have an arbitrary thickness without limitation from the shape of the reflective layer 4 because the reproducing layer 2 is formed after the formation of the reflective layer 4 having a rise and/or a recess faithful with the rise and/or the recess of the substrate 5. This arrangement attains a good transmittance distribution along a thickness direction, whereby it becomes possible to perform the reduction of signals from the shorter mark length. Therefore, with this arrangement, it is possible to attain a higher super resolution property and to realize an optical data recording medium in which a signal can be recorded in high density, and the signal recording in high density can be reproduced.

Incidentally, Blu-ray disc (BD) may be so arranged that a recording surface is provided on a light-incident surface of a substrate. In this type of recording medium, a laser beam can be irradiated to the recording surface without passing through the substrate. Therefore the laser beam can be irradiated from closer range than when in the arrangement in which the laser beam has to pass through the substrate. On the account of this, the laser beam having smaller spot size can be irradiated by using a lens having a high NA. With this arrangement, it is possible to attain reproduction of a signal from a mark having a shorter mark length. However, even though the recording layer is thus provided on the light-incident surface of the substrate, there is a limit in how much the distance between the recording surface and the laser irradiation point can be short. In this case, the arrangement in which the reproducing layer is provided on the light-incident surface of the substrate as in the present embodiment makes it possible to reproduce an optical data medium having a further shorter mark length.

Figure 2:
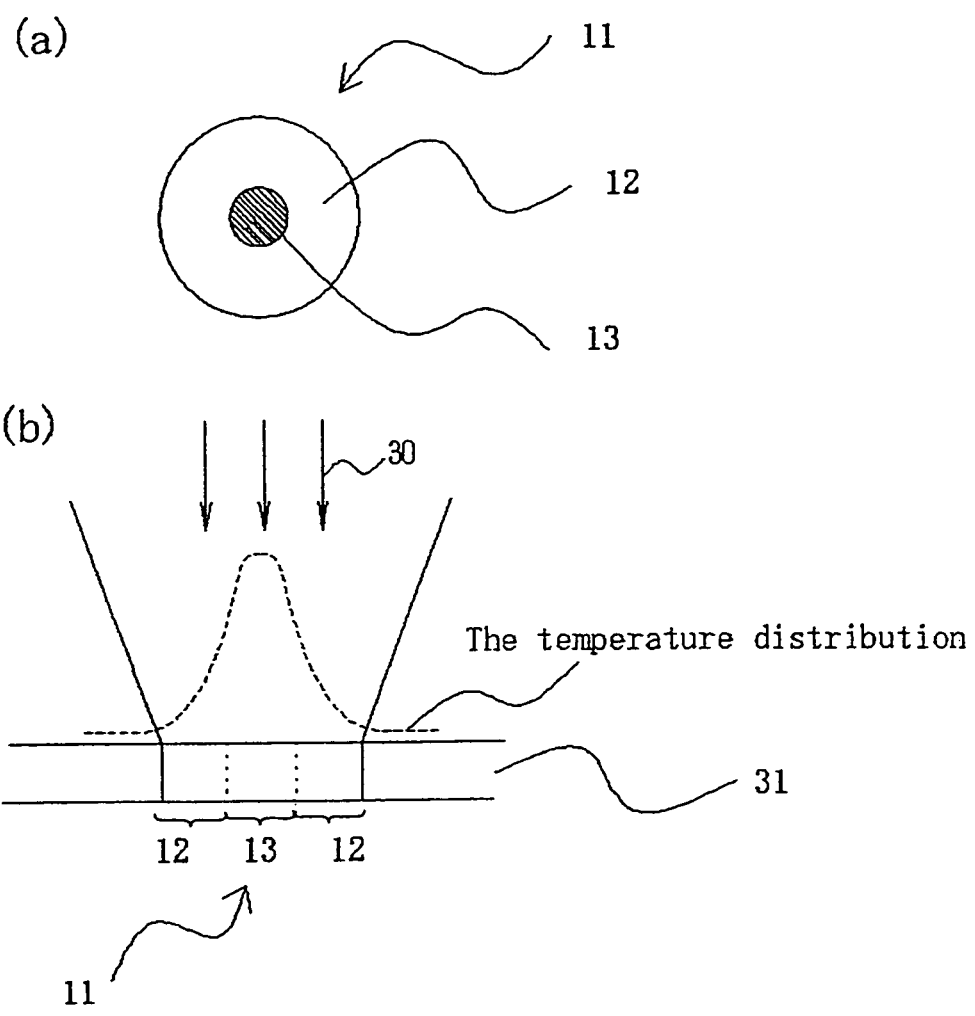
FIG. 2(a) and FIG. 2(b) are diagrams illustrating irradiation of a reproducing laser beam to the optical data recording medium of an embodiment of the present invention.

Hereinafter, a method of reproducing the optical data recording medium 31 is explained with reference to FIG. 2 (a) and FIG. 2 (b).

The reproduction in the optical data recording medium 31 can be carried out by detecting the light beam reflected from the light-incident surface of the substrate 5 by using an optical head (not shown) as a result of the irradiation of the reproducing laser beam 30 onto the light-incident surface from above the cover layer 1 by using a laser light source (not shown) and an optical system (such as a condenser lens). On the incident surface at least either pit or groove are provided.

Here, the irradiation of the reproduction beam 30 onto the optical data recording medium 31 is carried out in such a manner that an area having higher temperature and an area having lower temperature are produced in the laser beam spot of the reproducing layer 2. For example, when the reproducing laser beam 30 is irradiated from above the cover layer 1 to the reproducing-only optical data recording medium 31, the reproducing laser beam spot 11 is produced on the surface of the reproduction layer 2. The reproducing laser beam spot 11 has a temperature gradient from the center of the spot to the other area of the spot as shown in the FIG. 2(a). Therefore, a higher temperature area 13 and a lower temperature area 12 appear in the reproducing laser beam spot 30 on the surface of the reproducing layer 2. For example, the higher temperature area 13 has a temperature not less than 60° C. but less than 80° C., and the lower temperature area 12 has a temperature not less than 20° C. but less than 60° C. i.e., when the reproducing laser beam 30 is irradiated to the optical data recording medium 31, temperature is the highest in the center of the laser beam spot, and a part further from the center an area has a lower temperature.

Transmittance of the reproducing layer 2 changes in accordance with temperature changes. Therefore, the transmittance of the reproducing layer 2 for wavelength of the reproducing laser beam 30 decreases (low transmittance state) in the higher temperature area 13 where temperature rises due to irradiation of the reproducing laser beam 30. On the other hand, the transmittance of the reproducing layer 2 for wavelength of the reproducing laser beam 30 does not decrease in the lower temperature area 12 where temperature does not rise very much even though the reproducing laser beam 30 is irradiated thereto.

Figure 3:
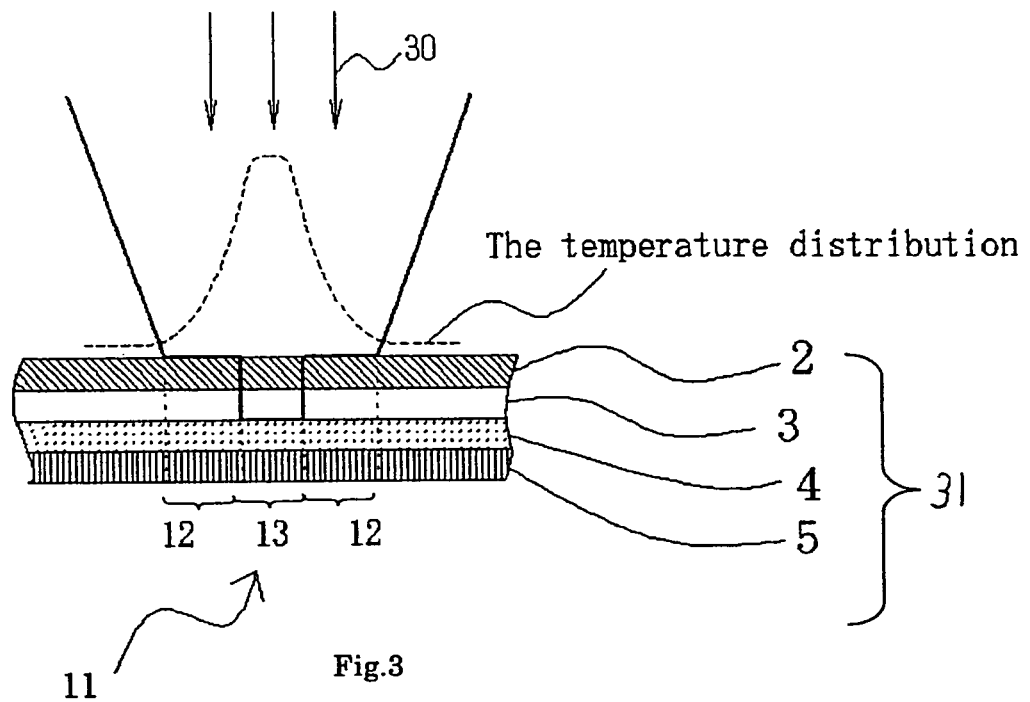
FIG. 3 is a diagram illustrating how the reproducing laser beam is irradiated to the optical data recording medium of an embodiment of the present invention.

Accordingly, most of the laser beam irradiated to the optical data recording medium 31 (the laser beam irradiated to the lower temperature area 12) are shielded off by the reproducing layer 2, and only the laser beam irradiated to the higher temperature area 13 passes through the reproducing layer 2 as shown in FIG. 3. On account of this, only the laser beam having passed through the reproducing layer 2 reaches the light absorption layer 3 and the reflective layer 4. Therefore, the spot size of the laser beam produced on a surface of the reflective layer 4 is virtually reduced. Consequently, it is possible to perform reproduction of a mark having a mark length shorter than a mark length of the resolution limit of the optical system.

Note that when the reproducing laser beam 30 having the higher temperature area and the lower temperature area is irradiated, the light absorption layer 3 absorbs the reproducing laser beam 30 and converts the beam into heat. Therefore, the light absorption layer 3 produces a large amount of heat after absorbing the reproducing laser beam 30 having passed through the higher temperature area 13. Because the heat generated in the light absorption layer 3 travels to the reproducing layer 2 located nearby (preferably contiguous to) the light absorption layer 3, temperature in the higher temperature area 13 of the reproducing layer 2 rises more. Accordingly, the transmittance of the laser beam irradiated to the higher temperature area 13 in a reproducing layer 2 increases more. This makes it easier to attain a further smaller spot size of the laser beam on the reflective layer 4, thereby attaining reproduction of higher quality.

The optical data recording medium having the reproducing layer of the embodiment of the present invention may be, but not limited to a disc-shaped optical data recording medium such as CDs (Compact Discs), CD-ROMs (Compact Disc-Read Only Memorys), CD-Rs (Compact Disc-Recordables), CD-RWs (Compact Disc-ReWritables), DVDs, DVD-ROMs, DVD-Rs, DVD-RWs, DVRs (Blu-ray Discs), DVR (Blu-ray Disc)-ROMs, and the like.

Also, the arrangement of the present invention is not limited to the optical data recording medium 31. For example, instead of providing the cover layer 1 made of glass on a surface of the reproducing layer 2, the optical data recording medium may be so arranged that a resin layer having refraction index and heat conductivity similar to those of the air is provided contiguously on the reproducing layer 2. (The resin layer must be absolutely adhered to the reproducing layer 2.) Because a resin having smaller refraction index and heat conductivity than the air has does not exist at the present moment, it is believed that a maximum performance can be obtained by the arrangement in which the reproducing layer is provided contiguously to a layer of air.

Moreover, the optical data recording medium may be so arranged as not to include the reflective layer, if that surface of (a reflective surface) the substrate 5 which faces to the reproducing layer 2 has enough reflectivity.

The optical data recording medium may be so arranged that the rise and/or the recess, those of which indicates a start address of data and an end address of data are not provided. However, in this case, the optical data recording medium does not indicate where recording point and/or reproducing point are.

Note that the embodiment of the present invention includes a recordable optical recording medium.

In order to obtain the recordable optical data recording medium, the light absorption layer 3 of the embodiment is so arranged as to be made of a material with which the light absorption layer 3 becomes recordable, so as to have functions of converting light into heat and of recording data, thereby causing the optical data recording medium to be recordable. It is possible to raise examples of the materials with which the light absorption layer 3 becomes recordable as follows: a phase change recording material (such as GeSbTe, or the like), a pigment, and a magnet-optical recording material (such as TbFeCo, or the like).

As described above, that optical data recording medium of the present invention, in which irradiation of a light beam is used for recording or reproducing data, includes a reproducing layer, provided to face a light-incident surface of the substrate. The reproducing layer is for reproduction of a signal from a mark having a mark having a mark length shorter than a resolution limit of an optical system of a reproducing apparatus for reproducing the optical data recording medium.

The "reproducing layer for reproduction of a signal from a mark having a mark having a mark length shorter than a resolution limit of an optical system of a reproducing apparatus for reproducing the optical data recording medium" is a layer which is provided to reproduce a mark length shorter than the laser beam spot which is narrowed by the optical system of the reproducing apparatus. For example, only higher temperature area of the laser beam, which is irradiated to the reproducing layer, passes through the reproducing layer if a material which increases its transmittance when an intensive laser beam is irradiated or when temperature increases is used for the reproducing layer. As a result, the spot size of the laser beam is reduced. Accordingly, it becomes possible to reproduce a mark length shorter than the laser beam spot which is narrowed by the optical system of the reproducing apparatus.

In light of the characteristics of the material, the reproducing layer needs to be provided above the layers—for example, such as a layer which reflects the laser beam—on the light-incident surface of the substrate. Therefore, when the reproducing layer is provided on a reverse surface to that surface of the substrate from above which the laser beam is irradiated, the reproducing layer needs to be provided firstly on the surface of the substrate. Then, above the reproducing layer, the other layers are provided. On the other hand, according to the foregoing arrangement, it is possible to provide the reproducing layer on the top of layers (except the cover layer) on that surface of the substrate from above which the laser beam is irradiated, after the other layers, for example a layer for reflecting the laser beam, are provided.

Because the reproducing layer can be provided on that surface of the substrate from above which the laser beam is irradiated after the other layers are provided, it is possible to give the reproducing layer an arbitrary thickness, while letting the reflecting layer have a good rise and/or a good recess. On account of this, resolution is improved in case where the reproducing layer is made of a material whose transmittance is greatly changed by the thicker film thickness. Also, because the size of the laser beam becomes smaller, it becomes possible to reproduce a shorter mark length. Accordingly, because super-resolution quality is improved, an optical data recording medium in which data is recorded in high-density is obtained.

Note that in the arrangement, not only the film thickness of the reproducing layer is not limited but also resolution limit is improved when a conventional optical data recording medium and film thickness of the reproducing layer are arranged as above. This is described later in Examples.

To achieve the object of the present invention, the optical data recording medium includes (i) the substrate having the rise and/or the recess that contributes recording and/or reproduction on the light incident surface, (ii) functional layers, provided on the light incident surface of the substrate, assisting recording and reproducing data, and (iii) the reproducing layer, provided on the surface of the functional layers, having transmittance that changes in accordance with a light intensity distribution of the laser beam.

"The functional layers assisting recording and reproducing data" are one or more layers, which have functions of reflecting the laser beam, converting light to heat, recording data, or the like function. Each layer may have a single function or multiple functions. This is, the functional layer may have the function of converting light to heat and the function of recording data.

The reproducing layer needs to be provided so that the light is radiated via the reproducing layer to the functional layer. Therefore, in case where the reproducing layer is provided on the reverse surface to the non-light-incident surface of the substrate, it is necessary that the reproducing layer be provided on the non-light-incident surface of the substrate, and the functional layer is provided on the reproducing layer. On the other hand, according to the foregoing arrangement, the reproducing layer is provided on the top of layers layered on the substrate (the furthest layer from the substrate except the cover layer).

Therefore, with this arrangement, it is possible to give the reproducing layer an arbitrary thickness, while letting the reflecting layer have a good rise and/or a good recess. On account of this, resolution is improved in those cases wherein the reproducing layer is made of a material whose transmittance is greatly changed by the thicker film thickness. Also, it becomes possible to reproduce a shorter mark length. Accordingly, this gives the optical data recording medium a higher super-resolution property, and a high-density optical data recording medium is obtained.

Note that it is desirable that "the rise and/or the recess indicative of data or reproduction position" formed on the substrate includes a groove for recording a start address and an end address of the data, in addition to the pit or groove for recording the data. (The groove for recording the start address and end address of data indicates, after recording the data, where the reproduction point of the data is.) With this arrangement, the recording and reproducing of the data can be carried out without imposing a burden on the reproducing/recording apparatus. Thus, it is possible to reproduce the recorded data in higher density.

To achieve the object of the present invention, the optical data recording medium is so arranged that the reproducing layer includes a material whose transmittance changes in accordance with temperature. Because the transmittance of the reproducing layer changes in accordance with temperature, it becomes possible to attain a smaller size of the light beam spot desirably.

To achieve the object of the present invention, the optical data recording medium, at least a part of that surface of the reproducing layer to which the light beam is irradiated is exposed to air.

According to the arrangement, because at least a part of the surface of the reproducing layer to which the laser beam is irradiated is exposed to air, it is possible to attain a desirable difference between refractive index of the air and refractive index of the reproducing layer in irradiating the light beam onto the reproducing layer. On the account of this, it becomes easier to irradiate the laser beam to the reproducing layer.

Furthermore, in the arrangement in which the recording layer has a transmittance that is changeable by heat distribution caused by the light beam, conduction of the heat from the reproducing layer to the other layers is minimized. Thus, it is possible to heat the reproducing layer by the light beam efficiently.

Therefore, according to the foregoing arrangement, not only is it possible to prevent heat from transmitting from the reproducing layer, but also it is possible to increase a quantity of the reflected light beam. Accordingly, it is possible to obtain the optical data recording medium in which data is recorded in high density can be reproduced with better quality.

To achieve the object of the present invention, the optical data recording medium includes that light absorption layer for converting the light beam to heat, which is contiguous to the reproducing layer.

In those cases wherein an optical data recording medium of the present invention does not include the light absorption layer, the reproducing layer must have an light-heat converting function. In order to provide an light-heat converting function with the reproducing layer, the reproducing layer should be made of (i) a material whose optical characteristics are changeable only in accordance with light intensity distribution, or (ii) a material which converts light to heat.

On the other hand, according to the foregoing arrangement, the light beam having passed through the reproducing layer can be converted into heat thereby changing the temperature of the reproducing layer by the light beam efficiently with such a simple arrangement. Therefore, it is possible to change the temperature of the reproducing layer without providing a variety of functions with the reproducing layer. On the account of this, a super-resolution optical data recording medium, which costs less and is easier to be fabricated, can be obtained.

To achieve an object of the present invention, the optical data recording medium includes a reflective layer for reflecting the light beam as one of the functional layers, which is provided between the substrate and the reproducing layer.

In the arrangement in which the reflective layer is provided between the substrate and the reproducing layer, the reproduction layer is formed after the reflecting layer is formed so as to have the rise and/or the recess well corresponding to the rise and/or the recess of the reflecting layer.

Therefore, with this arrangement, it is possible to give the reproducing layer an arbitrary thickness, while letting the reflecting layer have a good rise and/or a good recess. As a result, the transmittance of the reproducing layer is distributed desirably in a thickness direction of the reproducing layer, thereby making it possible to attain the reproduction of the signal from the shorter mark length. This gives the optical data recording medium a higher super-resolution property.

Because the reflective layer is provided in the optical data recording medium, the optical data recording medium can be effectively reproduced even when the reproducing layer does not have enough reflectance. Thus, the super-resolution optical data recording medium which costs less and possesses high reliability is obtained.

To achieve the object of the present invention, the optical data recording medium includes the reproduction layer that is made of a metal oxide. Because the reproducing layer is made of a metal oxide, the super-resolution optical data recording medium of the present invention costs less and possesses higher reliability than heretofore was the case.

To achieve the object of the present invention, the optical data recording medium includes the reproducing layer that is made of a zinc oxide. Because the reproducing layer is made of zinc oxide, it is possible to read the non-flat surface having shorter mark length and to write data in high density in the optical data recording medium.

To achieve an object of the present invention, the optical data recording medium includes a light absorption layer made of one of silicon, germanium or an alloy of silicon and germanium. Because the light absorption layer is made of one of silicon, germanium or an alloy of silicon and germanium, it is possible to attain an optical data recoding medium having a reproducing layer whose temperature can be changed desirably by using the light beam, while keeping the low cost of the optical data recording medium.

To achieve the object of the present invention, the reproducing method of an optical recording medium includes the steps of (i) irradiating the laser beam from above the reproducing layer, and (ii) reproducing the mark having a mark length shorter than resolution limit of the optical system of the reproducing apparatus. On the account of this, it becomes possible to reproduce data recorded in the high-density optical data recording medium.

The invention being thus described, it will be obvious that the same may be varied in many ways. All such modifications as would be obvious to one skilled in the art are intended to be included within the scope of the following claims.

Furthermore, the present invention can be structured as follows.

A first optical data recording medium, in which irradiation of a light beam is used for recording or reproducing data, at least includes (i) a substrate and (ii) a reproducing layer, provided to face a light-incident surface of the substrate, for reproduction of a signal from a mark having a mark having a mark length shorter than a resolution limit of an optical system of a reproducing apparatus for reproducing the optical data recording medium, wherein the reproducing layer is provided on a surface of the substrate to which a laser beam is irradiated.

A second optical data recording medium is, in addition to the arrangement of the first optical data recording medium, arranged such that the substrate has a rise and/or a recess on its surface that is to face the reproducing layer, the rise and/or the recess contributing to recording and/or reproduction of data.

A third optical data recording medium is, in addition to the arrangement of the first or second optical data recording medium, wherein at least a part of the surface of the reproducing layer, to which the laser beam is irradiated, of the first or the second optical data recording medium is exposed to the air.

A fourth optical data recording medium, in addition to the arrangement of any one of the first through the third optical data recording media, includes an light absorption layer between the reproducing layer and the substrate.

A fifth optical data recording medium, wherein the light absorption layer of the forth optical data recording medium is made of a silicon or a germanium or an alloy of a silicon and a germanium.

A sixth optical data recording medium, wherein the reproducing layer of any one of the first through the fifth optical data recording media is made of a metal oxide.

A seventh optical data recording medium, wherein the reproducing layer of any one of the first through the fifth optical data recording media is made of a zinc oxide.

An eighth optical data recording medium, wherein any one of the first through the seventh optical data recording media includes a reflective layer between the light absorption layer and the substrate.

A reproducing method of any one of the first through the eighth optical data recording media includes a step of reproducing a shorter mark length signal than resolution limit of optical system of the reproducing apparatus.

EXAMPLES

Example 1

As an Example 1, an optical data recording medium having the following arrangement was produced (hereinafter, referred as "Example 1 disc"). As shown in the FIG. 1, pits creating a non-flat surface are provided on polyolefin-based resin substrate 5 having a 0.5 mm thickness. The pits corresponded to recorded data. On that surface of the polyolefin-based resin substrate 5 on which the pits are formed, an Al layer 4 (30 nm in thickness) used as a reflective layer, as Si layer 4 (50 nm in thickness) used as an light absorption layer, and a ZnO film 2 (225 nm in thickness) used as a reproducing layer were formed in this order. On a top surface of the reproducing layer 2, glass 1 (0.5 mm in thickness) as a cover layer was placed.

Figure 4:
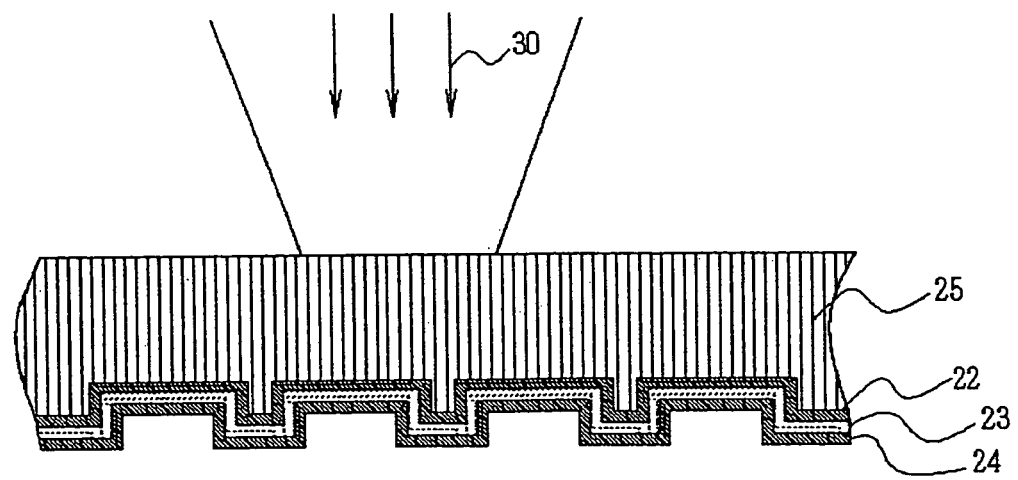
FIG. 4 is a cross section view of an optical data recording medium of a comparative example of the present invention.

Also, as a Comparative Example, an optical data recording medium with following arrangement was produced (hereinafter referred as "conventional disc"). As shown in FIG. 4, pits creating a non-flat surface were provided on a polyolefin-based resin substrate 25 having 0.5 mm thickness. On the surface of the polyolefin-based resin substrate having the pits, a ZnO film 22 (225 nm in thickness) used as a reproducing layer, a Si layer 23 used as an light absorption layer 23 (50 nm in thickness), and an Al layer 24 (30 nm in thickness) were layered in this order.

By using the Example 1 disc and the conventional disc, the correlation between a mark length and signal quality was measured. In the measurement, a wavelength of a reproducing laser beam 30 was set at 408 nm, an aperture NA of a lens was 0.65, and a linear velocity of scanning the reproducing laser beam was set at 3.0 (m/s).

Note that in both the discs, the layers having the same functions were identical in material and in thickness, in order to perform the comparison between the discs more accurately. Moreover, because the same measuring apparatus was used to compare the Example 1 disc and the conventional disc (so that optical systems until the light reached the reproducing layers were identical in both the discs), the conventional disc included a glass 1 which was as thick as the glass 1 which the Example 1 disc included.

Figure 5:
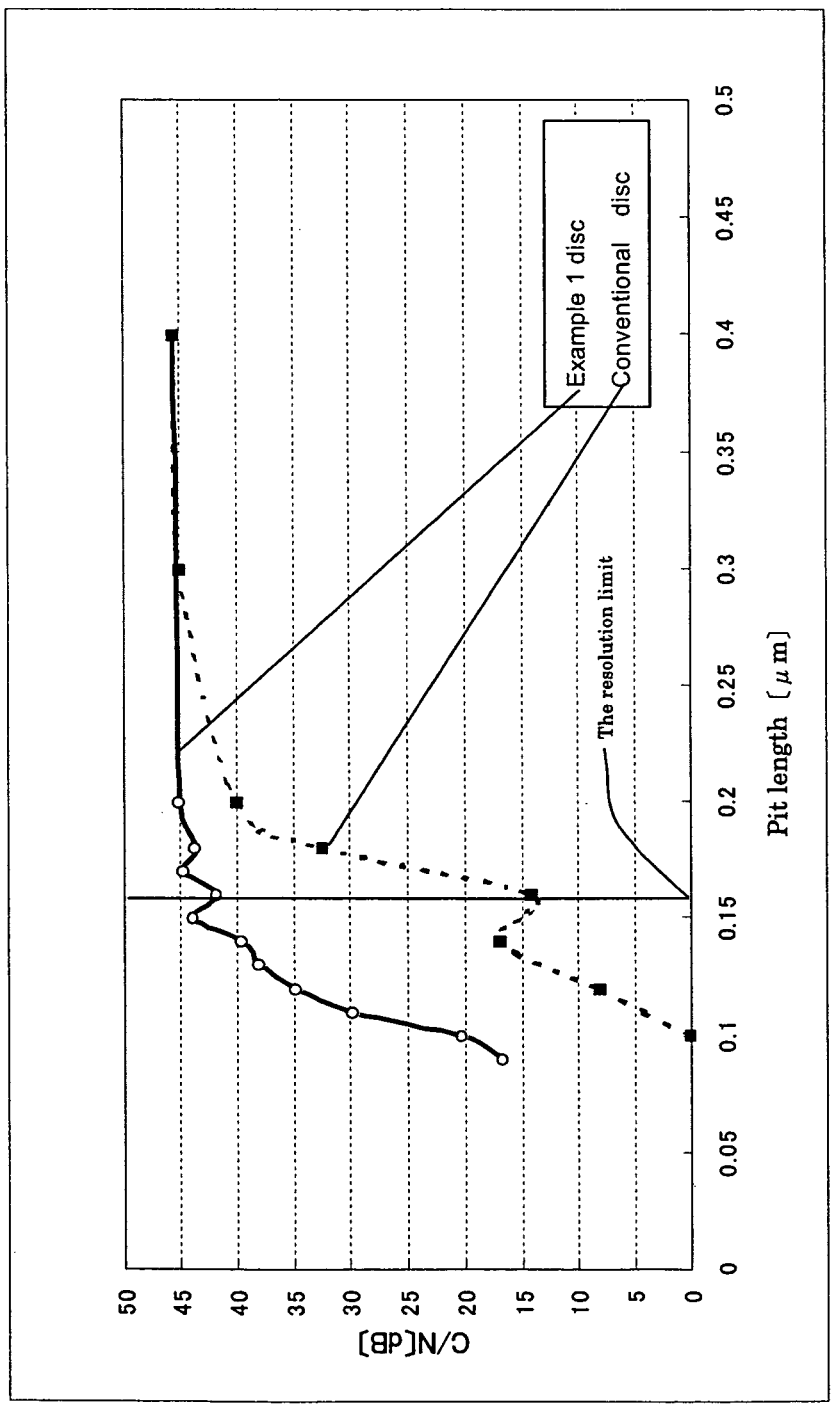
FIG. 5 is a graph comparing (i) an optical data recording medium relating to an example of the present invention to (ii) the comparative example, in terms of dependency of C/N on mark length.

As to the Example 1 disc, measurement of a C/N (appraisal standard of signal quality) of pits having 0.1 μm through 0.5 μm mark length (pit length), and C/N obtained by irradiation of the reproducing laser beam 30 onto the Example 1 disc from above the glass. The result is graphed in a solid line in FIG. 5. In FIG. 5, the horizontal axis shows the pit length, and the vertical axis is OTF (optical transfer function) showing C/N (appraisal standard of signal quality) and dependency of C/N on recording mark length. In other words, the vertical axis shows super-resolution quality.

As to the conventional disc, a measurement of a C/N (appraisal standard of signal quality) of a pit having 0.1 through 0.5 μm mark length (pit length) was carried out. The result is graphed in a broken line in FIG. 5.

According to FIG. 5, the Example 1 disc had a very high C/N values of 40 to 45 dB for the mark lengths (pit length) down to about 0.14 μm. (In addition, even for the pit length shorter than 0.14 μm, the C/N value of the Example 1 disc were still high, for example, the C/N value was 35 dB when the pit length was around 0.12 μm). In general, a C/N value needs to be no less than 40 dB in order to reproduce data finely. Therefore, in Example 1 disc used, it was possible to reproduce data finely for the pit lengths down to 0.14 μm. On the other hand, in the conventional disc, the C/N value decreased dramatically for the mark length shorter than 0.2 μm.

For the pit length 0.14 μm, the C/N of the Example 1 disc was around 40 dB and the C/N of the conventional disc was 17 dB. Also, for the pit length 0.2 μm or less, the C/N of the conventional disc decreased dramatically to a value lower than 40 dB. Therefore, for the conventional disc, the limit of the pit length was 0.20 μm for fine reproduction. As described above, the comparison showed that the arrangement of the present invention attained dramatically high super-resolution quality and the reproduction of the signal from the shorter mark length with high signal quality.

Example 2

In Example 2, a material of the reproducing layer was examined.

An optical data recording medium (hereinafter Example 2 disc) used in Example 2 was identical with the Example 1 disc in the Example 1, except that the reproducing layer of the Example 2 disc was made of, instead of ZnO, $SnO_2$. Correlation between mark lengths for signals, and qualities of the signals was measured for the Example 1 disc and Example 2 disc. The measurement was carried out as in Example 1. That is, the measurement of a C/N (appraisal standard of signal quality) of pits having 0.1 μm through 0.5 μm mark length (pit length) was carried out.

Figure 6:
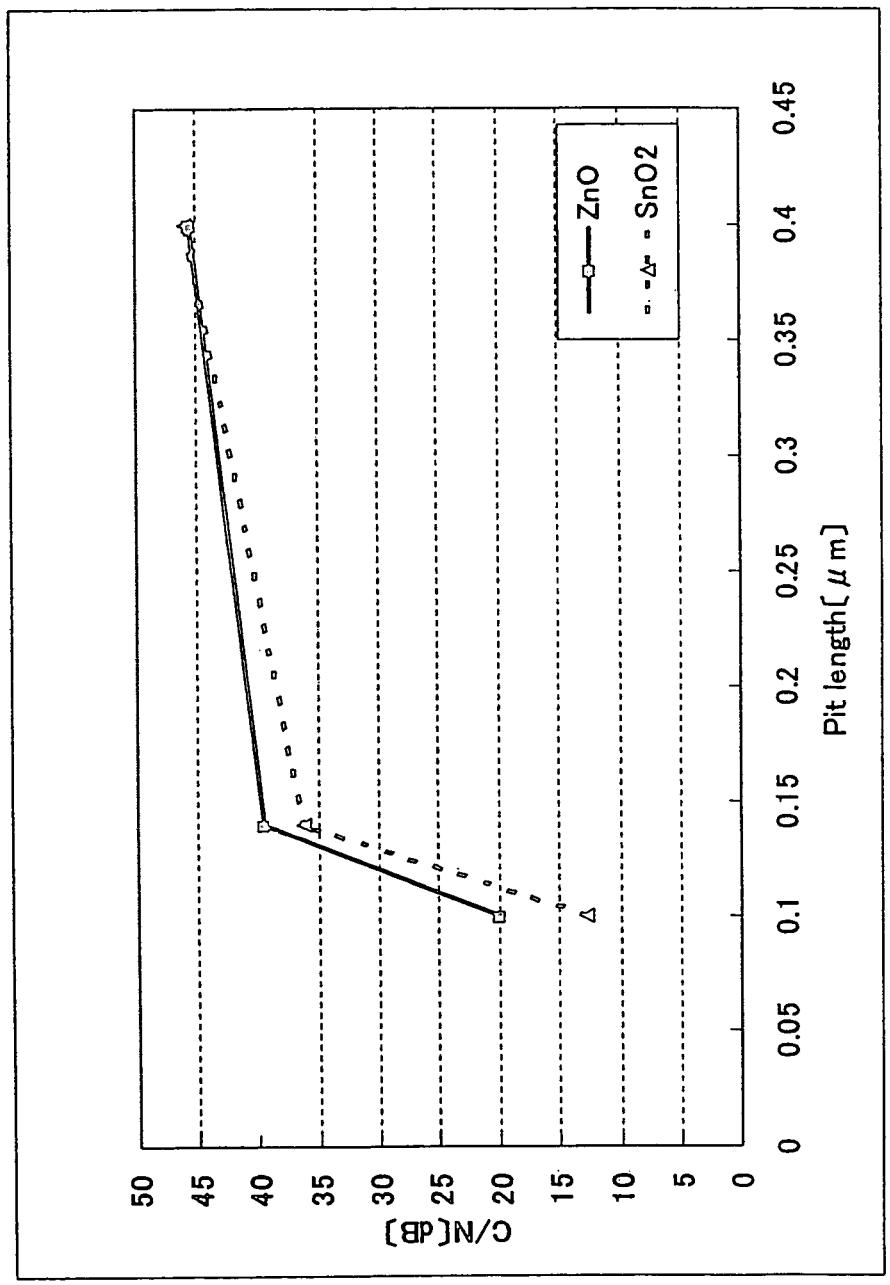
FIG. 6 is a graph illustrating the dependency of C/N on mark length of the optical data recording medium of the example of the present invention.

The results of the measurements of the Example 1 disc and the Example 2 disc are graphed in FIG. 6. In FIG. 6, the solid line is the result of the Example 1 disc, whereas the broken line is the result of the Example 2 disc. In FIG. 6, the horizontal axis shows the pit length, and the vertical axis is OTF (optical transfer function) showing C/N (appraisal standard of signal quality) and dependency of C/N on recording mark length. In other words, the vertical axis shows super-resolution quality.

According to FIG. 6, especially for the pit length of 0.14 μm or less, a C/N of the Example 1 disc made of ZnO was 5 to 10 dB higher than a CN of the Example 2 disc made of $SnO_2$. This explains that the arrangement in which the reproducing layer is made of ZnO enables reproduction of a signal from a mark having a shorter mark length.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is (US):

1. An optical data recording medium, in which irradiation of a light beam is used for reproducing recorded data, comprising:
   a substrate having pits disposed on a light incident surface thereof, corresponding to the recorded data, which are shorter than a resolution limit of an optical system of a reproducing apparatus which reproduces that optical data recording medium; and
   a reproducing layer for improving the resolution of optical signals from said pits and passing said improved resolution optical signals from said pits to said optical system of said reproducing apparatus in a form reproducible by said reproducing apparatus, the reproducing layer being provided so as to face said light-incident surface of said substrate.

2. The optical data recording medium as set forth in claim 1, wherein:
   the reproducing layer is made of a material whose transmittance changes in accordance with temperature.

3. The optical data recording medium as set forth in claim 1 wherein:
   at least a part of a light-incident surface of the reproducing layer is exposed to air.

4. The optical data recording medium as set forth in claim 1 further comprising:
   a light absorption layer for converting an incident light beam directed toward said light incident surface of said substrate to heat, the light absorption layer being contiguous to the reproducing layer.

5. The optical data recording medium as set forth in claim 1 further comprising:
   a reflective layer for reflecting an incident light beam directed toward said light incident side of said substrate, the reflective layer being provided between said light incident side of said substrate and said reproducing layer.

6. The optical data recording medium as set forth in claim 1 wherein:
   the reproducing layer is made of a metal oxide.

7. The optical data recording medium as set forth in claim 6, wherein:
   the reproducing layer is made of a zinc oxide.

8. The optical data recording medium as set forth in claim 4, wherein:
   the light absorption layer is made of one of silicon, germanium and an alloy of silicon and germanium.

9. An optical data recording medium, in which irradiation of a light beam is used for reproducing recorded data, comprising:
   a substrate having a light incident surface containing pits, corresponding to the recorded data, which are shorter than a resolution limit of an optical system which reproduces the optical data recording medium;
   a reproducing layer, stacked on the light incident surface of the substrate in which the pits are provided, the reproducing layer having a changeable transmittance with respect to an irradiated light beam irradiated on the reproducing layer and directed toward said light incident surface of said substrate, the changeable transmittance being changeable in accordance with an intensity distribution of the light beam irradiated on the reproducing layer; and
   a reflective surface, provided between the substrate and the reproducing layer, for reflecting a light beam that has passed through the reproducing layer.

10. The optical data recording medium as set forth in claim 9, further comprising:
    a reflective layer provided between the substrate and the reproducing layer, and including the reflective surface.

11. The optical data recording medium as set forth in claim 9, further comprising:
    a light absorption layer, provided between the substrate and the reproducing layer, for converting, to heat, the light beam irradiated thereon.

12. The optical data recording medium as set forth in claim 9, wherein:
    at least a part of that surface of the reproducing layer which is a reverse surface to the surface facing the substrate is exposed to air.

13. A reproducing method of an optical data recording medium in which irradiation of a light beam is used for reproducing data recorded in the optical data recording medium,
    said optical data recording medium including:
    a substrate having a light incident surface containing pits, corresponding to recorded data, which are shorter than a resolution limit of an optical system of a reproducing apparatus which reproduces the optical data recording medium; and
    a reproducing layer for improving the optical resolution of optical signals from said pits and passing said improved resolution optical signals to said optical system of said reproducing apparatus in a form reproducible by said reproducing apparatus, the reproducing layer being provided so as to face said light-incident surface of the substrate,
    said reproducing method comprising the step of:
    irradiating the light beam from above the reproducing layer to the light incident surface side of said substrate so as to reproduce the pits.

14. A reproducing method of an optical data recording medium in which irradiation of a light beam is used for reproducing data recorded in the optical data recording medium,
said optical data recording medium including:
a substrate containing pits in a light incident side thereof, corresponding to the recorded data, which are shorter than a resolution limit of an optical system of a reproducing apparatus which reproduces the optical data recording medium;
a reproducing layer stacked on the light incident surface of the substrate in which the pits are provided, the reproducing layer having a changeable transmittance with respect to an irradiated light beam irradiated on the reproducing layer and directed toward said light incident side of said substrate, the changeable transmittance being changeable in accordance with an intensity distribution of the light beam irradiated on the reproducing layer; and
a reflective surface, provided between the substrate and the reproducing layer for reflecting a light beam that has passed through the reproducing layer,
said reproducing method comprising the step of:
reproducing said recorded data by irradiating a light beam onto said optical data recording medium from above the reproducing layer.

* * * * *